(12) United States Patent
Lee et al.

(10) Patent No.: US 7,409,158 B2
(45) Date of Patent: Aug. 5, 2008

(54) LARGE-CAPACITY OPTICAL ROUTER USING ELECTRIC BUFFER

(75) Inventors: Ki-Cheol Lee, Suwon-shi (KR); Yun-Je Oh, Yongin-shi (KR); Sang-Hyun Doh, Kyonggi-do (KR); Jong-Kwon Kim, Taejonkwangyok-shi (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 546 days.

(21) Appl. No.: 10/638,983

(22) Filed: Aug. 12, 2003

(65) Prior Publication Data

US 2004/0151171 A1    Aug. 5, 2004

(30) Foreign Application Priority Data

Feb. 4, 2003    (KR) .................... 10-2003-0006871

(51) Int. Cl.
*H04J 14/00* (2006.01)
(52) U.S. Cl. .......................... 398/51; 398/54
(58) Field of Classification Search ............. 398/57, 398/49, 50, 51, 54
See application file for complete search history.

(56) References Cited

U.S. PATENT DOCUMENTS

| 6,417,944 | B1 * | 7/2002 | Lahat et al. ............... 398/79 |
| 6,678,474 | B1 * | 1/2004 | Masuda et al. ............ 398/75 |
| 6,701,088 | B1 * | 3/2004 | Watanabe et al. .......... 398/51 |
| 6,786,827 | B2 * | 9/2004 | Hughes et al. ............ 470/63 |
| 7,142,787 | B2 * | 11/2006 | Horiuchi et al. .......... 398/154 |

(Continued)

FOREIGN PATENT DOCUMENTS

CN    1360414    7/2002

(Continued)

*Primary Examiner*—Shi K Li
(74) *Attorney, Agent, or Firm*—Cha & Reiter, LLC

(57) ABSTRACT

A large-capacity optical router is disclosed that exchanges data traffic such as IP packets, Ethernet frames, etc., at high speed in units of optical frames. The large-capacity optical router uses an electric buffer including input ports, output ports, an add port for inputting data received from a lower IP router, a drop port for outputting data to the lower IP router, a wavelength division demultiplexing section for wavelength-division-demultiplexing wavelength signals input through the input ports and the add port, an input interface section for converting optical frames from the wavelength division demultiplexing section into electric signals, and an optical switch for performing a high-speed switching of the optical frames from the input interface section. The large-capacity optical router also includes an output interface section for processing the optical frames output from the optical switch, a wavelength division multiplexing section for wavelength-division-multiplexing outputs of the output interface section and transmitting the multiplexed outputs to another large-capacity optical router, a drop interface section for processing the optical frames from the wavelength division multiplexer to the lower IP router, a header processing section for recognizing header information, an optical switch control section for controlling a connection state of the optical switch, a header reinserting section for reinserting headers into outputs of the optical router, and an edge traffic aggregator including of an ingress part for converting IP packets input from the lower IP router into optical frames and an egress part for converting the optical frames into IP packets and transmitting the converted packets to the IP router.

18 Claims, 10 Drawing Sheets

U.S. PATENT DOCUMENTS

| | | | |
|---|---|---|---|
| 2002/0018468 A1* | 2/2002 | Nishihara | 370/389 |
| 2002/0109878 A1* | 8/2002 | Qiao | 359/118 |
| 2002/0118241 A1* | 8/2002 | Fujii | 347/12 |
| 2002/0145786 A1* | 10/2002 | Chang et al. | 359/135 |
| 2004/0105675 A1* | 6/2004 | Beacken | 398/49 |

FOREIGN PATENT DOCUMENTS

| | | |
|---|---|---|
| EP | 1076468 | 2/2001 |
| JP | 08-065314 | 3/1996 |
| JP | 2002-057738 | 2/2002 |
| JP | 2002-165238 | 6/2002 |
| JP | 2003-018626 | 1/2003 |

* cited by examiner

LARGE-CAPACITY OPTICAL ROUTER USING ELECTRIC BUFFER

CLAIM OF PRIORITY

This application claims priority to an application entitled "Large-capacity optical router using electric buffer," filed in the Korean Intellectual Property Office on Feb. 4, 2003 and assigned Ser. No. 2003-6871, the contents of which are hereby incorporated by reference.

BACKGROUND OF THE INVENTION

1. Field of the Invention

The present invention relates to a large-capacity optical router that exchanges data traffic such as Internet protocol (IP) packets, Ethernet frames, etc., at high speed in units of optical frames, and more particularly to a large-capacity optical router using an electric buffer.

2. Description of the Related Art

Generally, with the increased demand of data services such as Internet, moving picture, video on demand (VOD), etc., large-capacity data traffic in the range of several hundred gigabits/second (Gb/s) to several terabits/second (Tb/s) is produced in a network. In order to perform a switching or routing of such data traffic, a large-capacity router/switch having a capacity of several hundred Gb/s to several Tb/s is required.

Conventional large-capacity IP routers are constructed by connecting numerous small-capacity IP routers together. In this type of IP router, 50~60% of the whole capacity is used for the mutual connection of the small-capacity IP routers. This causes a waste of bandwidth and an abrupt increase of the number of IP routers according to a required capacity. Two conventional methods have been used to construct such large-capacity routers.

FIG. 1 is a diagram illustrating the construction of a conventional all optical router, which will be used to discuss the first method for constructing the large-capacity router.

As illustrated in FIG. 1, optical data is exchanged through a space switch 14 composed of on-off gate switches 14-3. Any collision occurring in the optical data is prevented using a variable wavelength converter and an optical-fiber delay-line buffer 16. In addition, the optical data is switched using a variable wavelength converter and a wavelength router such as an N×N arrayed waveguide grating (AWG). Data collision is prevented through use of an optical-fiber delay line.

The second method is implemented by a large-capacity IP router adopting an interface of a speed over 10 Gb/s. According to this method, headers of input packets are recognized by packets, and the packet routing/switching is performed by driving an electric switch. Collision among the packets is prevented through an electric buffer. Using this method, a large-capacity IP router has been developed as a kind of terabit router.

In the all optical router of FIG. 1, an optical-fiber delay line is used to prevent collision among the optical data due to the absence of an optical memory. However, as the exchange capacity of optical routers increases and the length of optical data becomes long, the length of the optical-fiber delay line may reach several tens to several hundreds of kilometers, and this causes the size of the system to be enlarged and the complexity of the system is greatly increased.

It is also note that since the optical-fiber delay line uses the effect of time delay of an optical signal in the optical fiber, the system control becomes very difficult. The signal levels of the optical data also become different to properly detect due to loss or attenuation occurring in the optical fiber. In addition, most all optical routers use many variable wavelength converters for the switching or buffering. The variable wavelength converter is generally composed of a variable wavelength laser and a plurality of semiconductor optical amplifiers (SOAs). These added components cause the manufacturing cost to increase.

Also, the stabilization speed of the variable wavelength laser is very slow, i.e., in the range of several to several tens of milliseconds (ms), and thus it is not suitable for an optical router. In addition, in the all optical router, signal performance monitoring and signal regeneration are also difficult.

The all optical router of FIG. 1 uses many optical couplers. This causes a large path loss. In case of the electric IP router, since the packet forwarding is performed by recognizing the headers of the packets, there is a great difficulty in processing high-speed packets of 10 Gb/s. This has limited the interface to speeds of less than 40 Gb/s.

According to the conventional technology, forwarding speeds of 15 Mp/s and 60 Mp/s are required for processing 64-byte packets having speeds of 10 Gb/s and 40 Gb/s, respectively. Also, since not only add/drop packets but also path-through packets should be processed, the processing burden of the router greatly increases. This causes an inefficient use of the processing capacity.

While a high-speed electric switch can be used in the large-capacity IP router, such electric switches have limitations in speed and scalability. Also, numerous (e.g., several tens) large-capacity routers are needed for a large-capacity node, which requires a capacity of Th/s or more. This increases the complexity of the node and the node construction and the operation cost thereof.

Accordingly, there is a need in the art for improved large-capacity routers.

SUMMARY OF THE INVENTION

One object of the present invention is to solve the above-mentioned problems occurring in the prior art.

Another object of the present invention is to provide a large-capacity optical router that overcomes the limitations that the all optical router access method and the high-speed IP router access method.

It is another object of the present invention to provide a large-capacity optical router that solves the problems of a variable wavelength converter and an optical-fiber delay-line buffer in an all optical router and does signal performance monitoring and signal regeneration of an optical signal by using an electric buffer.

It is still another object of the present invention to provide a large-capacity optical router that solves the problems of switching speed and scalability of an electric switch by using an optical switch having a switching speed of several nanoseconds in distinction from a high-speed IP router access method.

It is still another object of the present invention to provide a large-capacity optical router that solves the limitations of forwarding and switching speed of a high-speed IP router by converting a packet into an optical frame having a predetermined length using an edge traffic aggregator and performing a switching operation.

It is still another object of the present invention to provide a large-capacity optical router that can greatly reduce the equipment occupying area and the construction and operation costs of a node by reducing the number of equipments constituting the node with a single platform having a capacity of Tb/s or more.

One embodiment of the present invention is directed to a large-capacity optical router including a plurality of input ports, a plurality of output ports, an add port for input data received from an Internet protocol (IP) router, a drop port for output data to the IP router, a wavelength division demultiplexing section for wavelength-division-demultiplexing signals input through the input ports and the add port, an input interface section for converting optical frames from the wavelength division demultiplexing section into electric signals, an optical switch for performing a high-speed switching of the optical frames output from the input interface section, an output interface section for processing the optical frames switched by and output from the optical switch, a wavelength division multiplexing section for wavelength-division-multiplexing output signals of the output interface section and transmitting the multiplexed outputs to another large-capacity optical router, a drop interface section for processing the optical frames output from the wavelength division multiplexer to the IP router, a header processing section for recognizing header information for controlling the optical router, an optical switch control section for controlling a connection state of the optical switch for switching the optical frames, a header reinserting section for reinserting headers into outputs of the optical router, and an edge traffic aggregator composed of an ingress part for converting IP packets input from the IP router into optical frames and an egress part for converting the optical frames into IP packets and transmitting the converted packets to the IP router.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
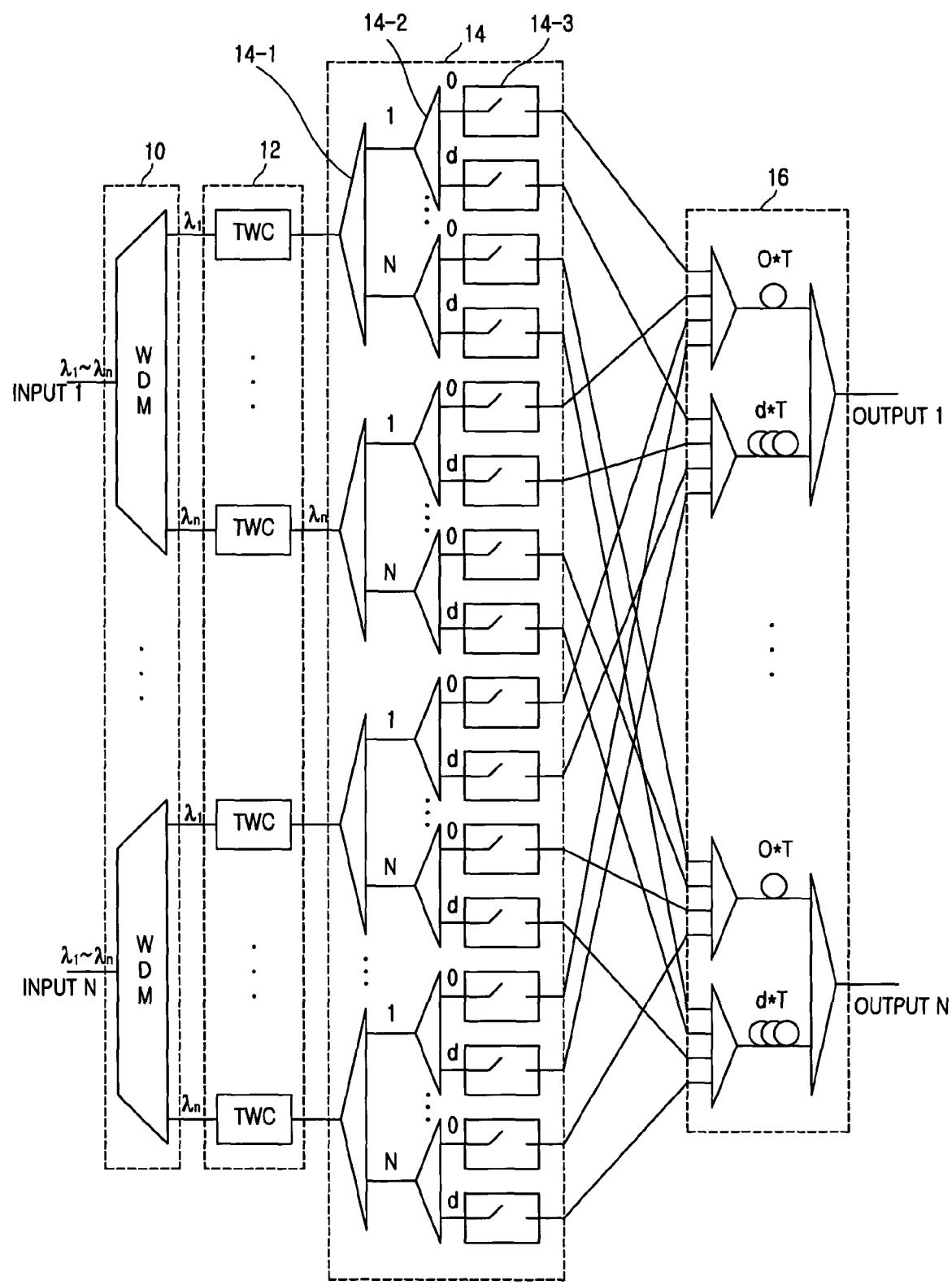
FIG. 1 is a diagram illustrating the construction of a conventional all optical router.

Hereinafter, large-capacity optical routers according to preferred embodiments of the present invention will be described with reference to the accompanying drawings. It is to be noted that the same elements are indicated with the same reference numerals throughout the drawings. Although a number of specific features, such as specific components of a circuitry, are given below, they are presented for a better understanding of the present invention only. Also, it will be clear to those skilled in the art that the present invention can be put into practice without such specific features. In the following description of the present invention, a detailed description of known functions and configurations incorporated herein will be omitted when it may obscure the subject matter of the present invention.

Figure 2:
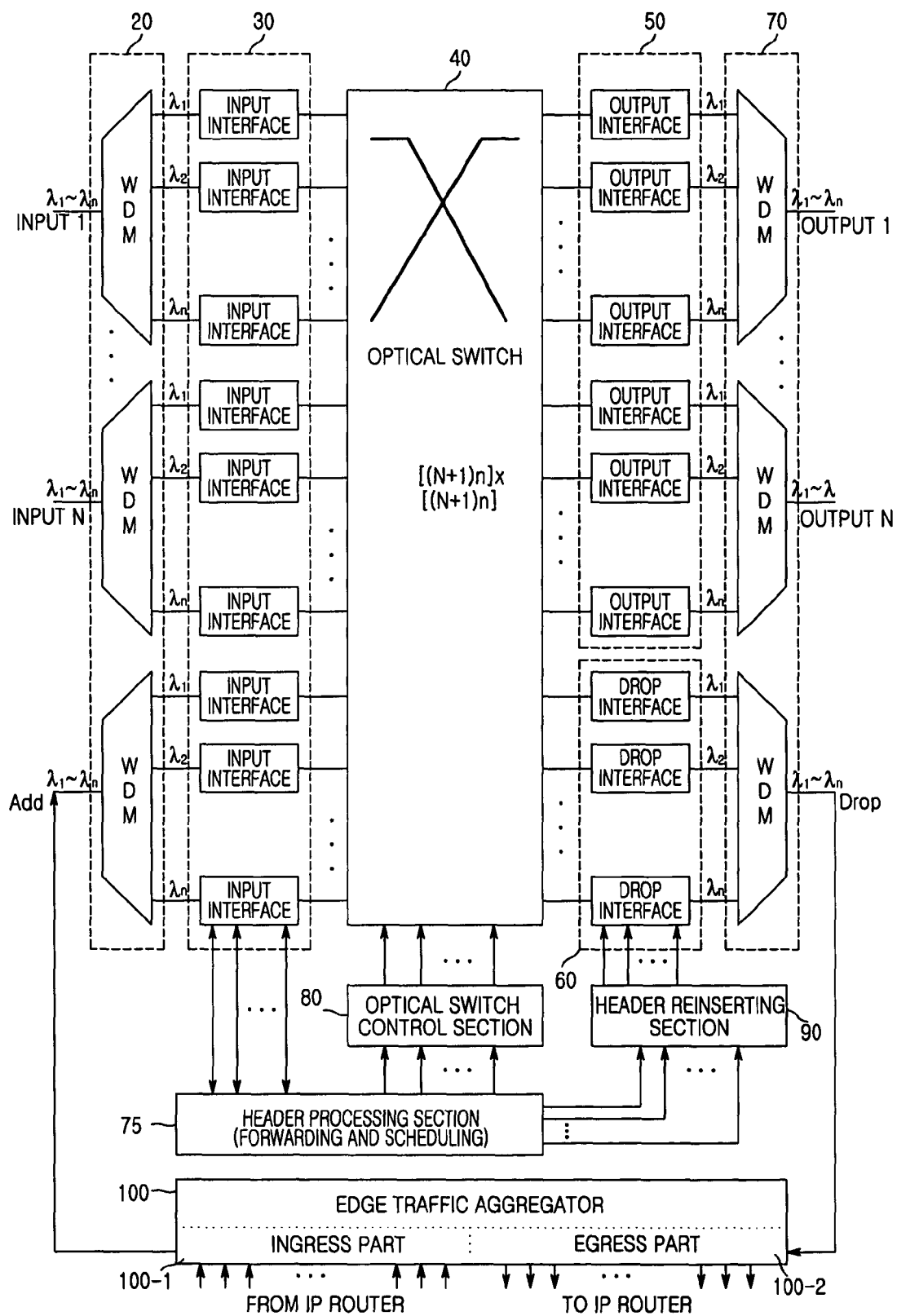
FIG. 2 is a diagram illustrating the construction of a large-capacity optical router according to an embodiment of the present invention.

FIG. 2 is a diagram illustrating the construction of a large-capacity optical router according to an embodiment of the present invention.

The large-capacity optical router according to the present invention has N input ports INPUT 1 to INPUT N, N output ports OUTPUT 1 to OUTPUT N, an add port Add for input data received from an IP router, and a drop port Drop for output data output to the IP router.

A wavelength division demultiplexing section 20 wavelength-division-demultiplexes wavelength signals $\lambda_1$ to $\lambda_N$ input through the input ports INPUT 1 to INPUT N and the add port Add. The wavelength division demultiplexing section 20 includes N+1 wavelength division demultiplexers (WDMs). An input interface section 30 converts optical frames input from the wavelength division demultiplexers into electric signals for processing and then converts the electric signals back to optical signals. To the output terminals of one wavelength division demultiplexer, N input interfaces, corresponding to the wavelength signals $\lambda_1$ to $\lambda_N$, are connected. An optical switch, i.e., an on-off gate switch 40 performs high-speed switching of the optical frames output from the input interface section 30. An output interface section 50 processes the optical frames switched by and output from the optical switch 40. A wavelength division multiplexing section 70 wavelength-division-multiplexes the outputs of the output interface section 50 and transmits the multiplexed outputs to another large-capacity optical router. A drop interface section 60 processes the optical frames to be output from the wavelength division multiplexing section 70 and transmitted to the lower IP router. A header processing section 75 recognizes header information for controlling the optical router. An optical switch control section 80 controls the connection state of the optical switch for switching the optical frames. A header reinserting section 90 reinserts headers into the outputs of the optical router. An edge traffic aggregator 100 includes an ingress part 100-1 and an egress part 100-2. The ingress part 100-1 converts IP packets input from the IP router into optical frames, and the egress part 100-2 converts the optical frames into IP packets and transmits the converted packets to the IP router.

Through input terminals and output terminals connected to the wavelength (division) multiplexing sections 20 and 70, data transmission/reception between the large-capacity optical routers is performed. The ingress part 100-1 of the edge traffic aggregator 100 processes the data input from the IP router, and the egress part 100-2 of the edge traffic aggregator 100 processes the data output to the IP router.

Figure 3:
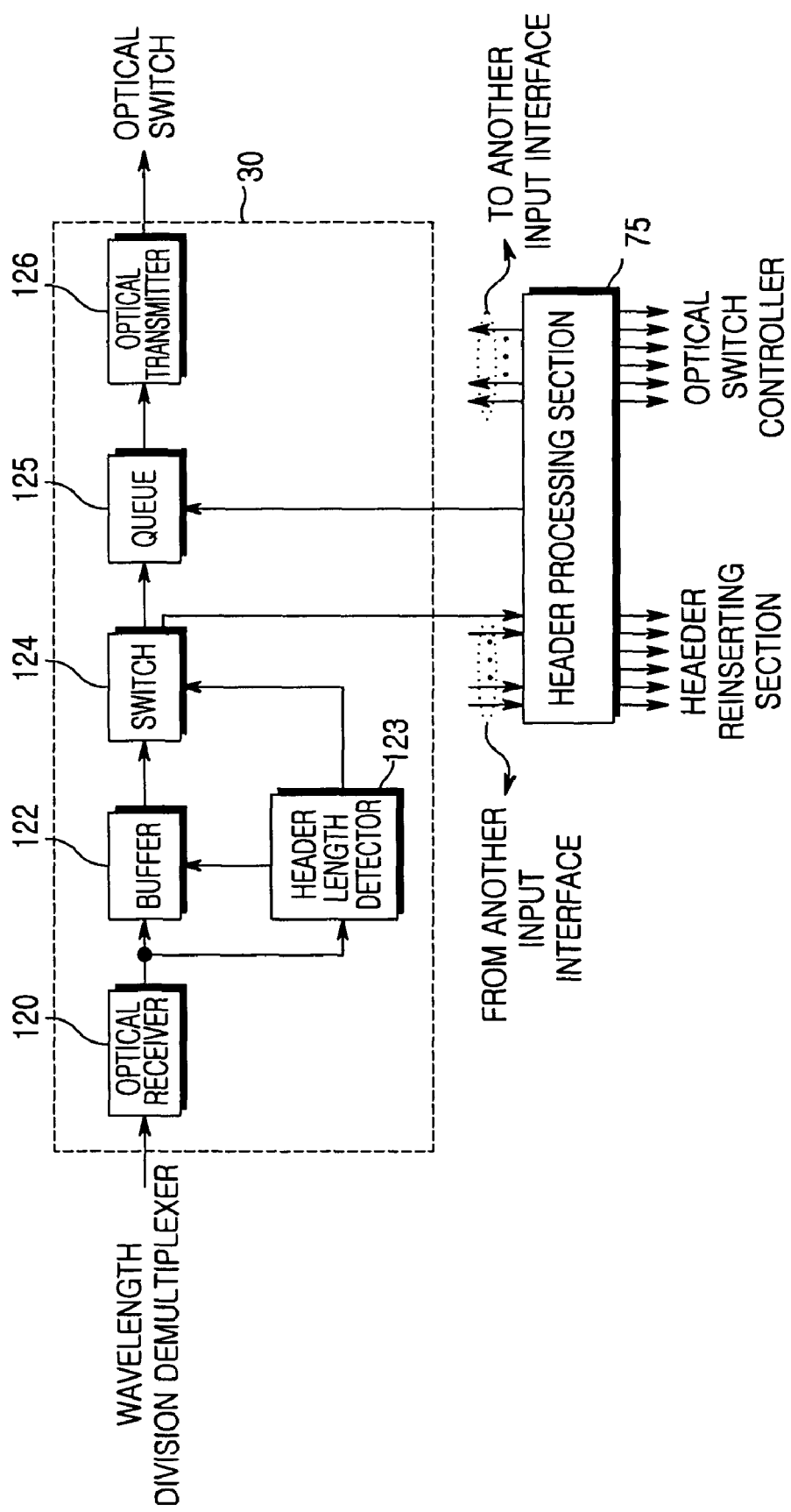
FIG. 3 is a block diagram of an input interface section of FIG. 2.

FIG. 3 is a block diagram of the input interface section 30 of FIG. 2.

An optical receiver 120 converts an optical frame input from the wavelength division demultiplexing section into an electric signal. A buffer 122 stores the frame converted by the optical receiver 120 for synchronization. A header length detector 123 extracts a header length in order to separate a header from the converted frame. A switch 124 separates the header and data from the frame. A queue 125 stores data separated by the switch for solving the collision before the data is switched. An optical transmitter 126 inputs data from the queue 125, and restores the frame which has been converted into the electric signal to the optical frame in order to transmit the data to the optical switch. The header processing section 75 reads an address with reference to the header of the input frame. Also, the header processing section 75 decides when to output, and a new header is inserted by the header reinserting section 90.

Figure 4:
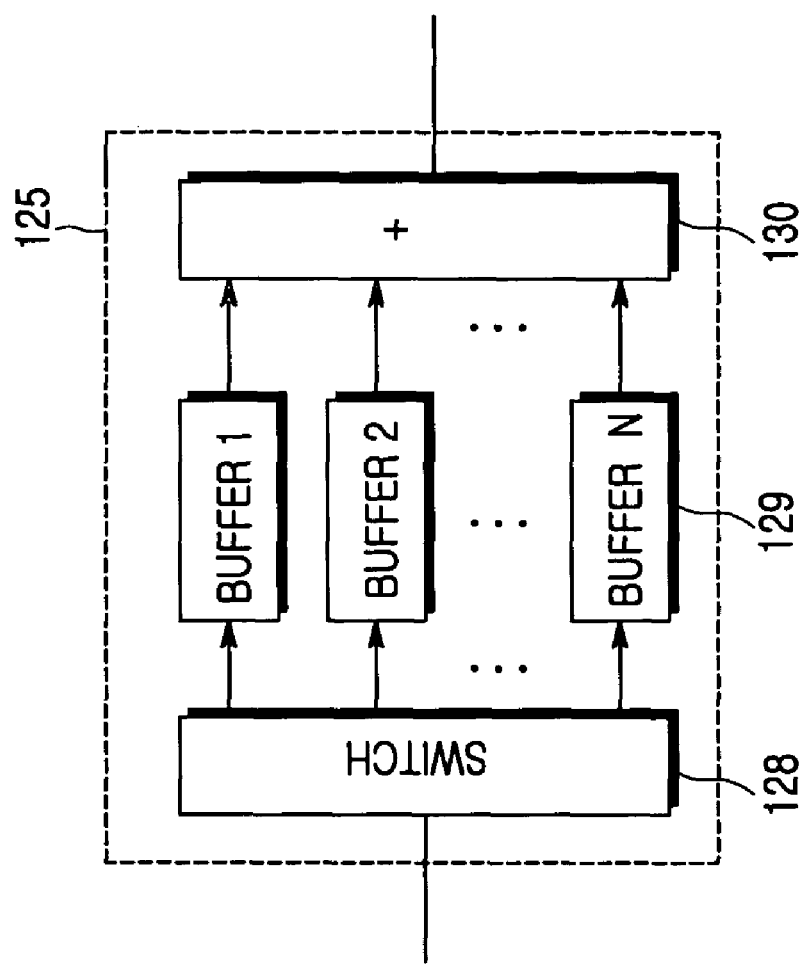
FIG. 4 is a block diagram of a queue included in the input interface section of FIG. 3.

FIG. 4 is a block diagram of the queue 125 of the input interface section 30 of FIG. 3.

The queue 125 includes a 1×N electric switch 128, N buffers 129, and a combiner 130. The switch 128 switches the input data by destinations, and transmits the data to the N buffers 129. The number of buffers 129 should at least equal the number of destinations and receive and store the data according to destination. If the stored data are accumulated for a predetermined amount of time, the accumulated data are transmitted to the optical transmitter 126 through the combiner 125. The input interface section 30 is connected to the header processing section 75 for processing the separated header. The header processing section 75 detects the destination of the data from the header, and controls to determine an output time of the data.

Figure 5:
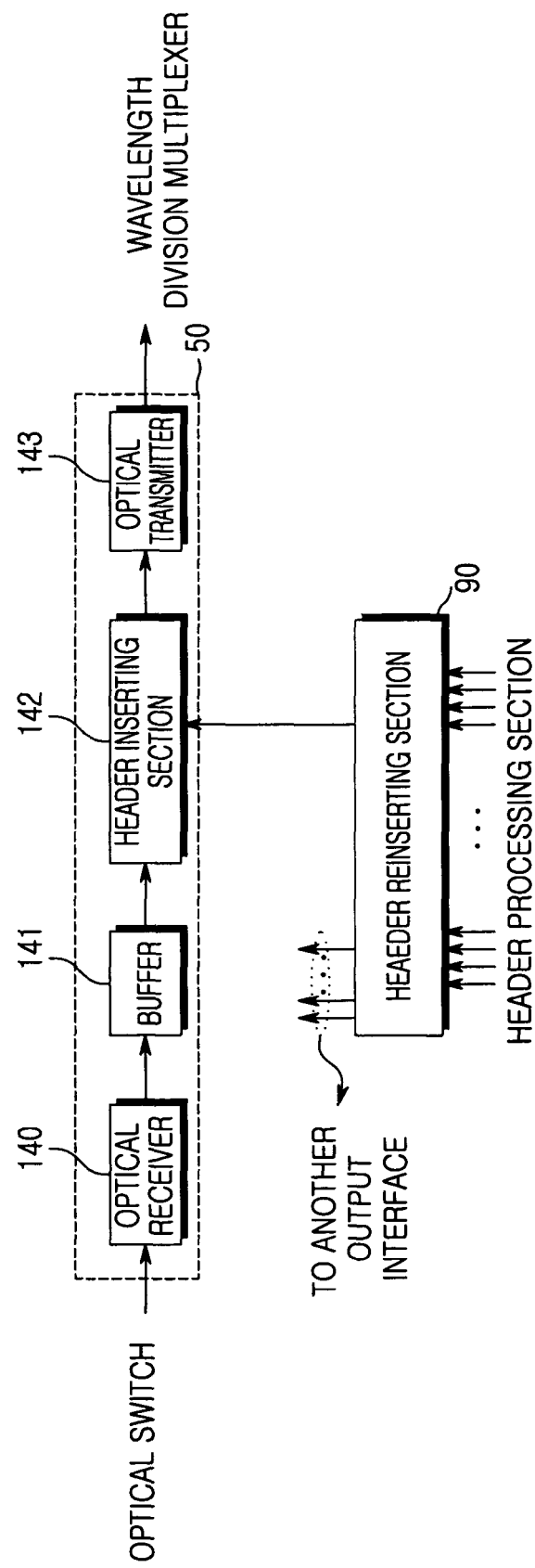
FIG. 5 is a block diagram of an output interface section of FIG. 2.

FIG. 5 is a block diagram of the output interface section 50 of FIG. 2.

The output interface section 50 includes an optical receiver 140 for converting the optical data switched by the optical switch 40 into an electric signal, a buffer 141 for temporarily storing the data for a header reinsertion, a header reinserter 142 for reinserting the header, and an optical transmitter 143 for transmitting the optical data combined with the header to a next node. The header reinserter 142 of the output interface 50 receives the header from the header reinserting section 90 that generates the header to be reinserted. The header reinserting section 90 detects the destination from the header information received from the input interface section 30, and provides a new header when the data is output.

The drop interface section 60 has the same construction as the output interface section 50 of FIG. 5 except for the header reinserter 142. The output of the drop interface section 60 is processed again in the egress part 100-2 of the edge traffic aggregator 100, and thus the header reinserter 142 is not required.

Figure 6:
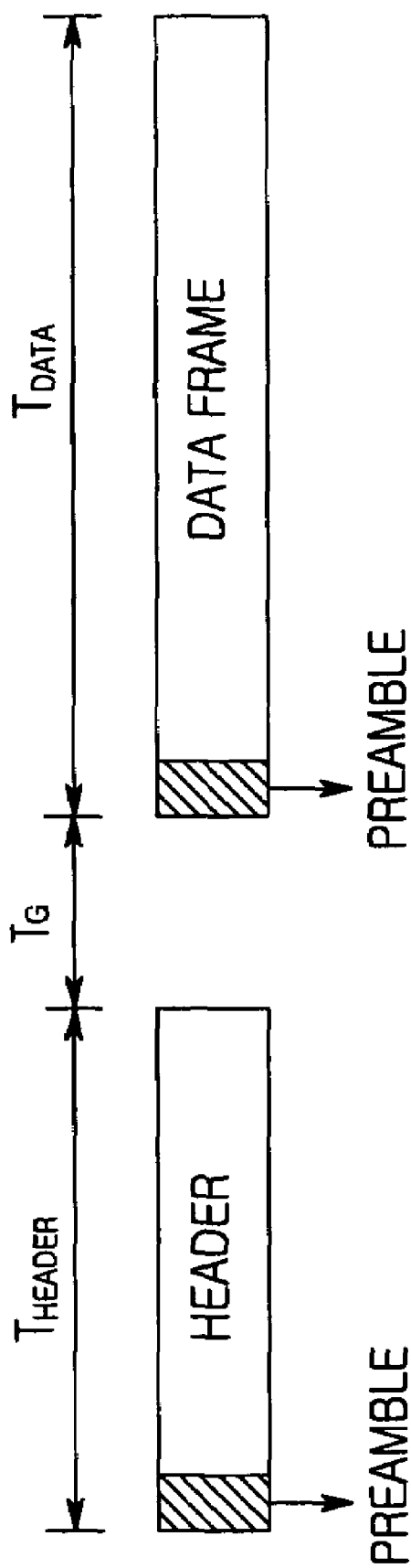
FIG. 6 is a diagram illustrating the construction of an optical frame that is separated into a header and a data frame by a switch illustrated in FIG. 3.

FIG. 6 is a diagram illustrating an optical frame that is separated into a header and a data frame by the switch 124 illustrated in FIG. 3.

The reference numeral $T_{HEADER}$ denotes a header, $T_{DATA}$ denotes a data frame. $T_G$ denotes a guard time, which indicates a time when the switch 124 separates the header and the data frame from the optical frame. As illustrated in FIG. 6, $T_G$ is used to prevent data loss when the switch separates the header and the data frame.

Figure 7:
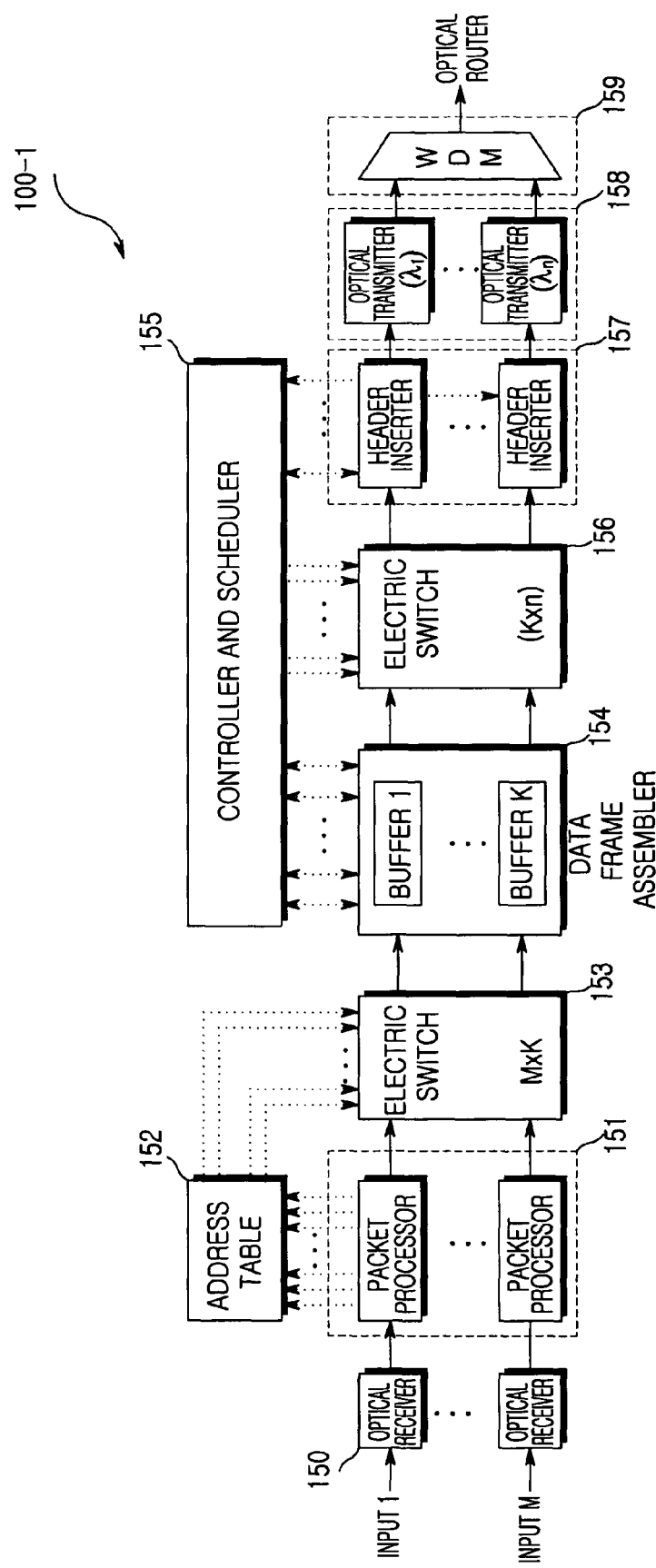
FIG. 7 is a block diagram of an ingress part of an edge traffic aggregator of FIG. 2.

FIG. 7 is a block diagram of the ingress part 100-1 of the edge traffic aggregator 100 of FIG. 2.

The ingress part 100-1 transmits the data received from the IP router to the optical router through the add port Add. The ingress part 100-1 includes M optical receivers 150 for receiving packet data input from the IP router, packet processing sections 151, connected to the optical receivers 150, respectively, for performing functions such as packet forwarding and so on; an address table 152 for providing address information for the packet forwarding; an electric switch 153 for switching inputs from the packet processing sections 151 to K buffers, to be explained later, for generating the optical frame; a data frame assembler 154, provided with the K buffers, for converting the switched packets into the optical frame; a controller and scheduler 155 for determining an output order and a wavelength of the optical frame generated from the data frame assembler 154; an electric switch 156 for transmitting the optical data of which the output order and the wavelength are determined to an optical transmitting section 158, to be explained later; n header inserting sections 157 for inserting the header before an optical modulation; the optical transmitting section 158 composed of n optical transmitters for optically modulating the optical frame combined with the header; and a wavelength division multiplexer 159 for wavelength-division-demultiplexing the optically modulated signals.

The data frame assembler 154 divides and stores the switched packets by destinations in the n buffers. If the data is accumulated for a predetermined amount of time, it processes the data by buffers. The controller and scheduler 155 detects the amount of data by buffers of the data frame assembler 154, and determines the output order and the wavelength of the optical frame.

Figure 8:
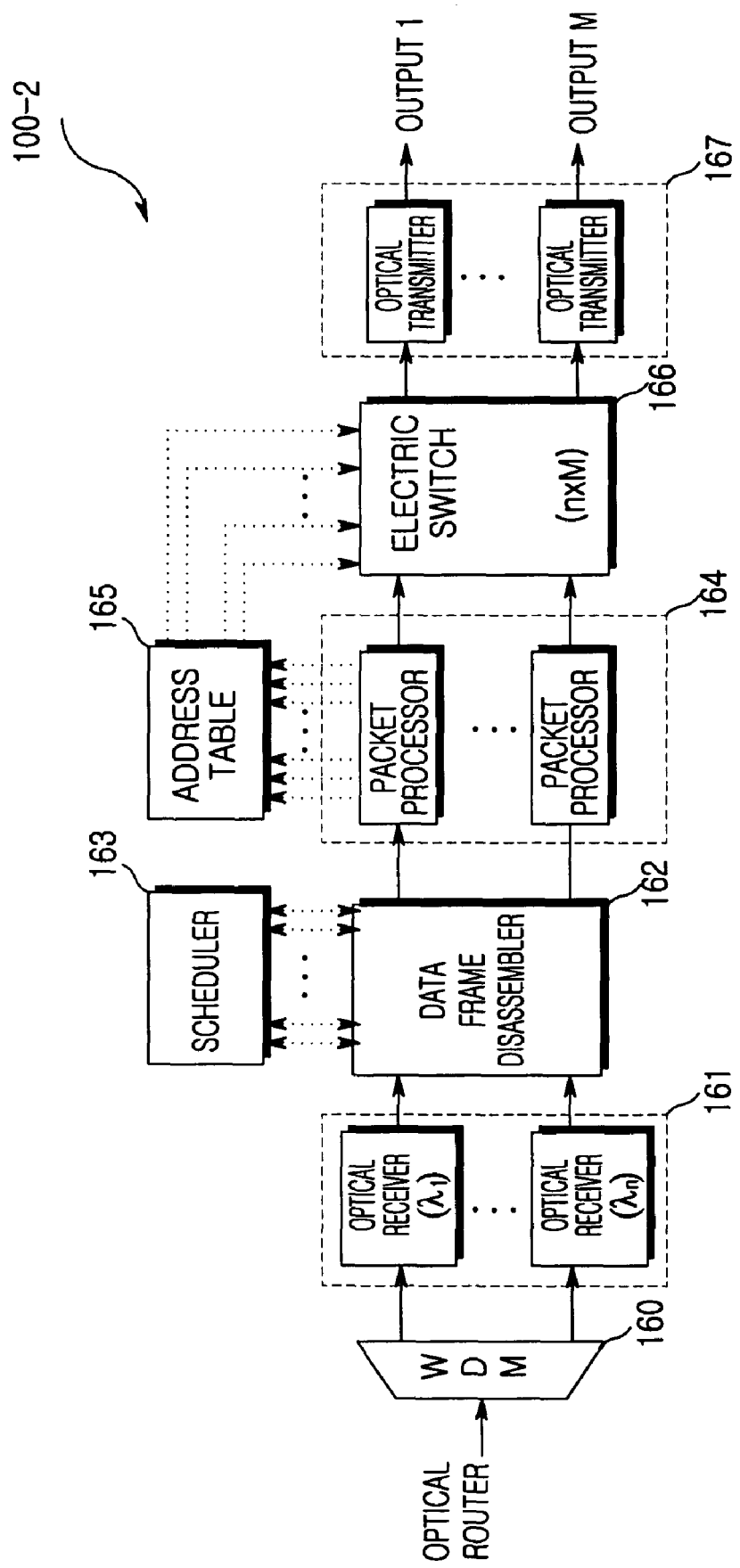
FIG. 8 is a block diagram of an egress part of an edge traffic aggregator of FIG. 2.

FIG. 8 is a block diagram of the egress part 100-2 of the edge traffic aggregator 100 of FIG. 2.

The egress part 100-2 receives the outputs of the drop interface section 60, and processes the data output to the lower IP router. The egress part 100-2 includes a wavelength division demultiplexer 160 for wavelength-division-demultiplexing the wavelength-division-multiplexed optical signal dropped by the optical router, n optical receivers 161 for converting the optical frame into an electric signal, a data frame disassembler 162 for separating the frame in units of IP packets and according to destination, a scheduler 163 for controlling an output order of the IP packets having been separated according to destination, packet processing sections 164 for processing the IP packets through a process such as forwarding and so on, an address table 165 for providing an address of the packet, an electric switch 166 for switching the processed packet to a correct destination IP router, and M optical transmitters 167 for optically modulating the switched packet.

Figure 9:
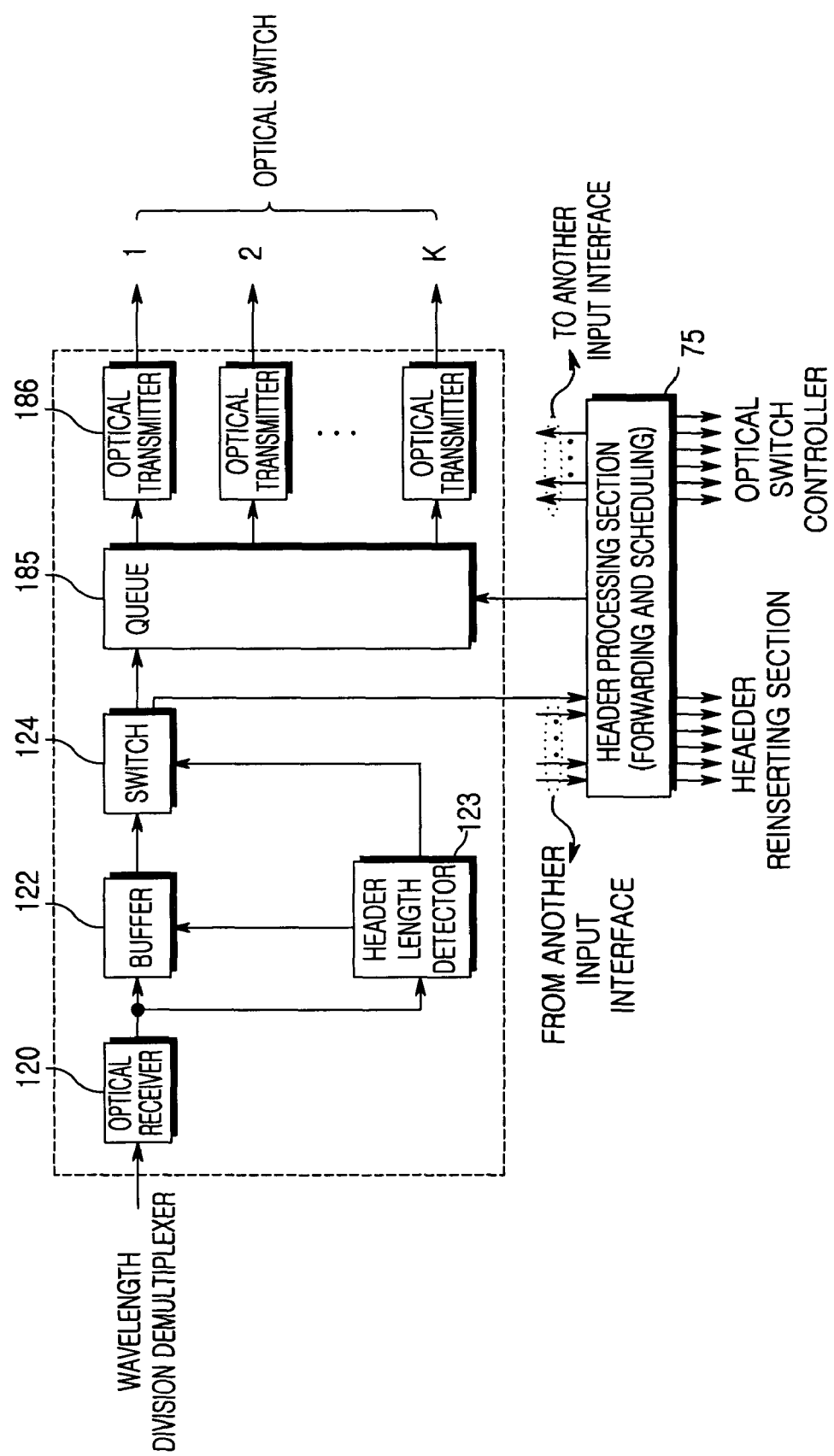
FIG. 9 is a block diagram of another embodiment of the input interface section of FIG. 3.

FIG. 9 is a block diagram of another embodiment of the input interface section 30 of FIG. 3. This embodiment provides additional switching efficiency for the optical router.

In comparison to the embodiment of FIG. 3, a queue 185 does not provide a single output, but provides multiple (for example, K) outputs. Accordingly, the number of optical transmitters 186 at least equal the number of the outputs. In this embodiment, the data is separately transmitted according to their destinations, and thus the processing speed is improved. A plurality of data frames output from a plurality of buffers (not illustrated) of the queue 185 are optically modulated by the plurality of optical transmitters 186 and then input to the optical switch.

More specifically, the input interface section 30 of FIG. 3 prevents a head of line (HOL) blocking problem using the multiple buffers 129 of FIG. 4, but since the queue 125 provides only one output, the buffer capacity in the queue becomes large. In order to solve this, multiple outputs are provided from the queue 185 with the multiple buffers as shown in FIG. 9, and the buffer capacity can be reduced with a higher switching efficiency. In this regard, by adjusting the number of multiple outputs of the queue 185, the buffer capacity and the switching efficiency can be adjusted. Since the queue 185 has multiple outputs, the input interface section 30 requires a plurality of optical transmitters 186. Also, the size of the optical switch 40 should be increased by as many as K times.

Figure 10:
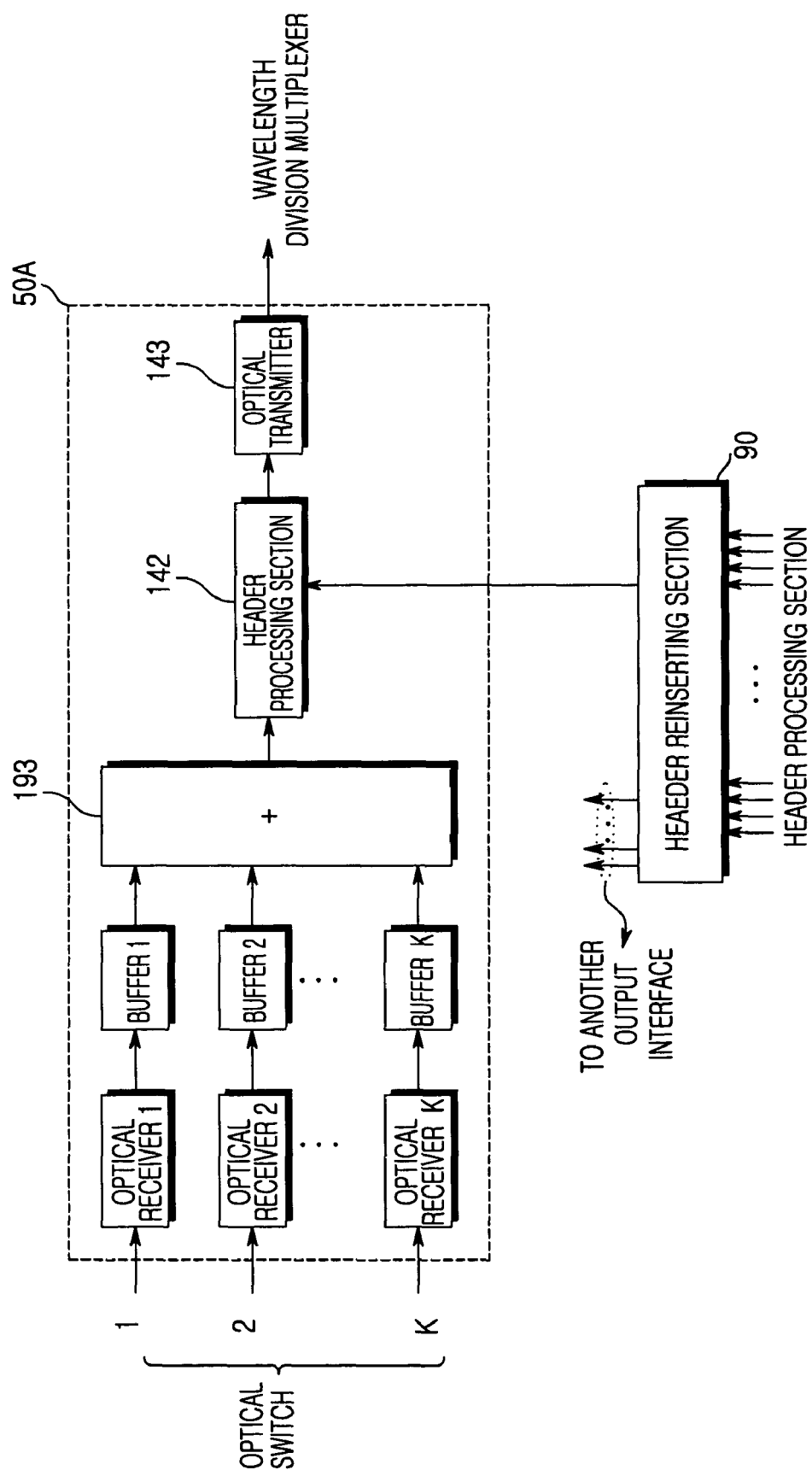
FIG. 10 is a block diagram of another embodiment of the output interface section of FIG. 5.

FIG. 10 is a block diagram of another embodiment of the output interface section 50 of FIG. 5.

In comparison to the embodiment of FIG. 5, a plurality of optical receivers and buffers (for example, K optical receivers and K buffers) are provided. A combiner 193 is also provided. In this embodiment, by employing the multiple optical receivers and buffers, the data is processed according to destination, and thus the processing speed can be improved.

Now, the operation of the optical router as constructed above according to the embodiments of the present invention will be explained in detail.

First, the operation of the ingress part 100-1 of the edge traffic aggregator 100 of FIG. 7 will be explained. IP packets transmitted from the IP router generally have wavelengths of 1.3 mm, and are converted into electric signals by the optical receiver 150 of the ingress part 100-1. Each converted packet is input to the packet processing section 151, which determines the destination port and the output order with reference to the address table 152. In the data frame assembler 154, as many buffers as the number of destination addresses (for example, K) exist. Thus, a packet, of which the destination port and the output order have been determined by the packet processing section 151, is switched by the M×K electric switch 153 to a buffer of the data frame assembler 154 that matches the destination address. If the data frame for a predetermined time period is formed in the buffer of the data frame assembler 154, an output request signal is transferred to the controller and scheduler 155. The controller and scheduler 155 that received the output request signal confirms if an available channel exists by checking the state of the output wavelength channel. If there is no available wavelength channel, the data frame waits in the buffer until the available wavelength channel is produced. If there is an available channel, the data frame filled in the buffer is switched to the optical transmitting section 158 having the wavelength channel selected by the K×n electric switch 156. A header is then reinserted into the data frame by the header inserting section 157.

In reinserting the header, the controller and scheduler 155 generates a header signal that indicates the destination address of the data frame and so on. This header signal and the switched data frames are combined by the header inserting section 157, and then switched to the optical transmitter 158. The combined frame structure is illustrated in FIG. 6. The header precedes the data frame by as much as the guard time. The header and the data frame have the fixed lengths of $T_H$ and $T_{DF}$, respectively. Also, the header and the data frame have different data speeds of $R_H[b/s]$ and $R_{DF}[b/s]$, respectively, and the speed of the data frame is the integer-number times the header frame speed (i.e., $R_{DF}=n \cdot R_H$).

For example, if the data frame is of 10 Gb/s, the header frame of 1.25 Gb/s can be used. Also, in order to recognize each starting point, the header and the data frame have preambles, respectively. As described above, the optical frame is optically modulated by the optical transmitting section 158, wavelength-division-multiplexed by the wavelength division multiplexer 159, and then transmitted to the add port Add of the optical router. The header and the data frame are modulated with the same wavelength and then transmitted. The frames to be transmitted to the IP routers among the optical frames switched by the optical router are input to the egress part 100-2 of the edge traffic aggregator 100 through the drop interface section 60.

Referring again to FIG. 8, the operation of the egress part 100-2 of the edge traffic aggregator will be explained.

The input optical signal is wavelength-division-demultiplexed by the wavelength division demultiplexer 160, and then converted into an electric signal by the optical receiving section 161. The converted data frame is separated into the original IP packet unit by the data frame disassembler 162. The separated IP packets are provided with output orders through the scheduler 163, processed by the packet processing section 164 with reference to the address table 165 to be transmitted to the destination IP router, and then switched by the n×M electric switch 166. The switched packets are transmitted to the destination IP router by the optical transmitting section 167.

Referring again to FIG. 2, the wavelength-division-multiplexed optical frame signal output from the ingress section 100-1 of the edge traffic aggregator and the wavelength-division-multiplexed optical frames are wavelength-division-demultiplexed by the wavelength division demultiplexing section 20, and then input to the interface section 30.

The optical frame input to the input interface section 30 is converted into an electric signal by the optical receiver 120 of FIG. 3. The converted electric signal is input to the buffer 122 and the header length detector 123. The header length detector 123 recognizes the starting point and the length of the header by detecting the preamble of the header. While the header length is detected, the frame is temporarily stored in the buffer. If the detection of the starting point and the length of the header is completed, the frame stored in the buffer 122 is input to the switch 124, and separated into the header and the data frame by the switch 124 using the information on the starting point and the length of the header detected by the header length detector 123. The separated header is input to the header processing section 75, and the data frame is input to the queue 125. The header processing section 75 reads the information on the destination address and so on in the header separated through the forwarding process, and determines the output order of the data frame through a scheduling process. The data frame is stored in the queue 125 having the construction as illustrated in FIG. 4 until the header processing section completes the scheduling. In order to solve the HOL blocking problem, the queue 125 has n buffers 129. The data frame output from the queue 125 by the scheduling is optically modulated by the optical transmitter 126, and then input to the optical switch. The optical transmitter 126 may include inexpensive short reach type elements.

According to the conventional methods, if the data packet has a transmission rate of 10 Gb/s, the header processing section must perform a high-speed process at 10 GHz. By contrast, since various embodiments of the present invention use a header having a speed that is 1/n times the data frame speed, the header processing section 75 may have a processing speed of 'data speed/n' Hz.

In addition, according to the conventional method, the header processing section should perform a high-speed process of several tens Mp/s for processing a short-length packet of about 64 bytes. However, according to various embodiments of the present invention, since the edge traffic aggregator 100 generates a long-length data frame, the header processing speed is greatly reduced in comparison to the conventional method. Also, the header processing section 75 generates the control signal to the optical switch control section 80 according to the result of forwarding and scheduling, and the data frame transmitted to the optical switch 40 according to the control signal is switched at high speed to the destination. Also, the header processing section 75 transmits header change information to the header reinserting section 90 for the header reinsertion.

The optical data frame switched by the optical switch 40 is input to the output interface section 50. This signal is then converted into an electric signal by the optical receiver 140 of FIG. 5, and then stored in the buffer 141. The header reinserting section 90 produces a new header using the header change information transmitted from the header processing section 75, and transmits the new header signal to the header inserter 142. The data frame stored in the buffer 141 is output and combined with the header by the header reinserting section 90, and optically modulated by the optical transmitter 143. The data frame is then wavelength-division-multiplexed by the wavelength division multiplexing section 70 and is transmitted to another optical router.

The data frame switched by the optical switch 40 is not output to another large-capacity optical router, but is output to the IP router. The data frame is transmitted to the egress part 100-2 of the edge traffic aggregator through the drop interface section 60 and the wavelength division multiplexing section 70. Since it is not required to insert the header to the dropped data frame, the drop interface section 60 is identical to the output interface section 50 of FIG. 5 except for the header inserter 142. The data frames input to the egress part 100-2 of the edge traffic aggregator are processed as illustrated in FIG. 5, and then transmitted to the IP router.

As described above, by utilizing the optical/electric/optical conversion, the various embodiments of the present invention can solve the problems of a variable wavelength converter and an optical-fiber delay-line buffer raised in the conventional all optical router, and enable easy signal performance monitoring and easy signal reproduction.

In addition, since various embodiments of the present invention use a high-speed optical switch unlike the conventional electric router access method, the problems of a speed and degree of expansion in the electric switch are also solved.

Also, various embodiments of the present invention solve the limitations of forwarding and switching speeds of the conventional IP router by performing switching in units of optical frames having a predetermined length. In this regard, the conventional IP router requires the forwarding speed of several tens of Mp/s, but the optical router according to aspects of the present invention can reduce the forwarding speed by several hundred Kp/s to several Mp/s by performing switching in units of optical frames of a predetermined length, and thus the burden of router process can be greatly lowered.

Furthermore, various embodiments of the present invention reduce an upper area, construction and operation costs of a node by greatly reducing the number of elements constituting the node with a single structure having a capacity of Tb/s or more, and thus it can be expected that the present invention will be efficiently used in a large-capacity communication network.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An optical router comprising:
    a plurality of input ports;
    a plurality of output ports;
    an add port configured to input data received from a lower Internet protocol (IP) router;
    a drop port configured to output data to the IP router;
    a wavelength division demultiplexing section arranged to wavelength-division-demultiplex wavelength signals input through the input ports and the add port;
    an input interface arranged to convert optical frames input from the wavelength division demultiplexing section into electrical signals, to separate a header from the electric signal, and to convert the electrical signals to optical frames;
    an optical switch configured to perform a high-speed switching of the optical frames output from the input interface;
    an output interface arranged to process the optical frames switched by and output from the optical switch;
    a wavelength division multiplexer arranged to wavelength-division-multiplex outputs of the output interface section and transmit the multiplexed outputs to another optical router;
    a drop interface arranged to process the optical frames transmitted to the IP router via the wavelength division multiplexing section;
    a header processor arranged to recognize header information and to control the optical router, and to read an address of a destination by using the header received from the input interface;
    an optical switch controller arranged to control a connection state of the optical switch and to switch the optical frames;
    a header reinserter arranged to reinsert headers into outputs of the optical router, said headers being inserted at a rate such that the data frame rate is an integer number of the header rate; and
    an edge traffic aggregator including an ingress part and an egress part, the ingress part configured to convert IP packets input from the IP router into optical frames, and the egress part configured to convert the optical frames into IP packets and to transmit the converted packets to the lower IP router,
    the input interface comprises a buffer being arranged to store the electrical signals and being configured to perform synchronization, and the output interface converting optical frames input from the optical switch into electric signals and recovering optical signals and reinserting headers received from the header inserter.

2. The optical router as claimed in claim 1, wherein the wavelength division demultiplexing section includes a plurality of wavelength division demultiplexers.

3. The optical router as claimed in claim 1, wherein the input interface comprises:
    an optical receiver arranged to convert an optical frame input from the wavelength division demultiplexing section into an electrical signal;
    a header length detector being coupled to the optical receiver and the buffer and being arranged to extract a header length in order to separate a header from the electrical signal;
    a switch coupled to the buffer arranged to separate the header and data from the electrical signal;
    a queue coupled to the switch arranged to store data separated by the switch;
    an optical transmitter being coupled to the queue, being arranged to restore the electrical signal to the optical frame in order to transmit the data to the optical switch;
    a header processor arranged to read an address with reference to the header of the electrical signal and determine a header output time; and
    a header reinserting section arranged to insert a new header output from the header processor,
    wherein the buffer is coupled to the optical receiver.

4. The optical router as claimed in claim 3, wherein a predetermined guard time is provided between the header separated from the switch and the data frame in order to prevent data loss when the header and the data frame are separated.

5. The optical router as claimed in claim 3, wherein the queue of the input interface comprises:
    a plurality of electric switches arranged to switch the input data by destinations;
    a plurality of buffers arranged to receive and store the data by destinations to accumulate a predetermined amount of data; and
    a combiner coupled to the plurality of buffers.

6. The optical router as claimed in claim 5, wherein the plurality of buffers include at least one buffer for each possible destinations.

7. The optical router as claimed in claim 1, wherein the input interface comprises:
    an optical receiver arranged to convert optical frames input from the wavelength division demultiplexing section into electrical signals;

a header length detector coupled to the optical receiver and arranged to extract a header length in order to separate headers from the electrical signal;

a switch coupled to the buffer and arranged to separate the headers and data from the electrical signals;

a queue coupled to the switch and arranged to store data separated by the switch;

a plurality of optical transmitters arranged to input data from the queue and to restore the electrical signals to optical frames in order to transmit the data to the optical switch;

a header processor arranged to read addresses with reference to the headers of the electrical signals and deciding header output times; and a header reinserting section arranged to insert new headers output from the header processor, wherein the buffer is coupled to the optical receiver.

8. The optical router as claimed in claim 7, wherein the buffer includes a plurality of outputs.

9. The optical router as claimed in claim 1, wherein the output interface comprises:

an optical receiver arranged to convert the optical data switched by the optical switch into an electric signal;

a buffer arranged to temporarily store the data for a header reinsertion;

a header reinserter arranged to reinsert the header; and an optical transmitter arranged to transmit the optical data combined with the header to a next node.

10. The optical router as claimed in claim 1, wherein the output interface comprises:

a plurality of optical receivers arranged to convert the optical data switched by the optical switch into electric signals;

a plurality of buffer couple to the plurality of optical receivers, respectively, and arranged to temporarily store the data output from the plurality optical receivers for a header reinsertion;

a header reinserter arranged to reinsert the header; and an optical transmitter arranged to transmit the optical data combined with the header to a next node.

11. The optical router as claimed in claim 1, wherein the ingress part of the edge traffic aggregator comprises:

a plurality of optical receivers arranged to receive packet data input from the lower IP router;

a plurality of packet processors coupled to the plurality of optical receivers, respectively, and arranged to perform at least a packet forwarding function;

an address table coupled to the plurality of packet processors;

a first electric switch coupled to the plurality of packet processors;

a data frame assembler, provided with a predetermined number of buffers, arranged to convert switched packets into the optical frames;

a controller and scheduler arranged to determine output orders and wavelengths of the optical frames generated from the data frame assembler;

a second electric switch arranged to transmit the optical data of which the output order and the wavelength are determined;

a predetermined number "n" of header inserting sections arranged to insert the header before an optical modulation;

an optical transmitting section including n optical transmitters arranged to optically modulate the optical frames combined with the headers; and a wavelength division multiplexer arranged to wavelength-division-multiplexing the optically modulated signals.

12. The optical router as claimed in claim 11, wherein the data frame assembler divides and stores the switched packets by destinations in the buffers, and when a predetermined amount of data is accumulated, it processes the data by buffers; and wherein the controller and scheduler detects the amount of data by buffers of the data frame assembler, and determines the output order and the wavelength of the optical frame.

13. The optical router as claimed in claim 1, wherein the egress part of the edge traffic aggregator comprises:

a wavelength division demultiplexer arranged to wavelength-division-demultiplex the wavelength-division-multiplexed optical signal dropped by the optical router;

a plurality of optical receivers arranged to convert the optical frame into the electric signal;

a data frame disassembler arranged to separate the frame in a unit of an IP packet and then separate the frame by destinations;

a scheduler arranged to control an output order of IP packets separated by destinations;

a plurality of packet processor arranged to process the IP packets through at Least a forwarding process;

an address table coupled to the plurality of packet processors;

an electric switch coupled to the plurality of packet processors; and a plurality of optical transmitters arranged to optically modulate the switched packets.

14. The optical router as claimed in claim 1, wherein the edge traffic aggregator converts the packets input from the IP router into the optical frames of a predetermined length according to addresses of destinations, the input interface processes the optical francs through an optical/electric/optical conversion, the optical switch performs a switching of the optical frames, and the output interface processes the optical frames through the optical/electric/optical conversion again and ten transmits the optical frames to a next optical router node or the edge traffic aggregator.

15. The optical router as claimed in claim 1, wherein the ingress part is configured to convert the packets input from the IP router into the data frames of a predetermined length according to addresses of destinations, and to combine the headers with the data frames to transmit the combined optical frames.

16. The optical router as claimed in claim 1, wherein the edge traffic aggregator has the egress part which receives the optical data frames switched by the optical router, separates the received optical data frames by IP packets, and transmits the separated optical data frames to the IP router.

17. The optical router as claimed in claim 1, wherein the input interface includes a header length detector arranged to detect a header starting point and a header length, and a header processor arranged to separate the header and the data frame to process the data frame.

18. The optical router as claimed in claim 1, wherein the output interface section includes a header reinserting section arranged to insert a new header into the data frame switched by the optical switch.

* * * * *